United States Patent
Pasupuleti

(10) Patent No.: US 8,155,427 B2
(45) Date of Patent: Apr. 10, 2012

(54) WAFER-SCALE IMAGE ARCHIVING AND RECEIVING SYSTEM

(75) Inventor: Ajay Pasupuleti, Rochester, NY (US)

(73) Assignee: Nanoark Corporation, Rochester, NY (US)

( * ) Notice: Subject to any disclaimer, the term of this patent is extended or adjusted under 35 U.S.C. 154(b) by 1090 days.

(21) Appl. No.: 11/956,911

(22) Filed: Dec. 14, 2007

(65) Prior Publication Data

US 2008/0170775 A1 Jul. 17, 2008

Related U.S. Application Data

(60) Provisional application No. 60/884,768, filed on Jan. 12, 2007.

(51) Int. Cl.
*G06K 9/00* (2006.01)
*G03F 7/00* (2006.01)
*H01L 21/00* (2006.01)

(52) U.S. Cl. .................. 382/145; 430/317; 430/323
(58) Field of Classification Search ................. None
See application file for complete search history.

(56) References Cited

U.S. PATENT DOCUMENTS

| | | | |
|---|---|---|---|
| 3,607,347 | A | 9/1971 | Sprague et al. |
| 5,567,573 | A | 10/1996 | Morton |
| 6,629,292 | B1 | 9/2003 | Corson et al. |
| 6,680,162 | B1 | 1/2004 | Sinha et al. |
| 7,211,369 | B2 | 5/2007 | Sinha et a |
| 2003/0076775 | A1 | 4/2003 | Sato et al. |
| 2004/0250233 | A1 | 12/2004 | Sinha et al. |
| 2004/0264305 | A1 | 12/2004 | Watanabe et al. |
| 2006/0082880 | A1 | 4/2006 | Lissotschenko |

*Primary Examiner* — Gregory J Toatley
*Assistant Examiner* — Amanda Merlino
(74) *Attorney, Agent, or Firm* — Hiscock & Barclay, LLP

(57) ABSTRACT

A system for the long-term storage and high-speed retrieval of images stored on silicon wafers. The images are stored by utilizing semiconductor fabrication techniques. These images are organized and managed using metadata in the form of a barcode. Each barcode is a unique identifier that contains the location information for each specific image on the silicon wafer substrate. The system further provides an identifier in an electronic database that references the appropriate barcode and describes the contents of the image. The images and barcodes are transferred to specific predetermined locations on the silicon wafer. The stored images are retrieved by use of a software program that searches for a user's queries in the electronic database and outputs the specific barcode to the image reader. The image reader translates the barcode information for the desired image and drives the optics or the silicon wafer to the appropriate location.

19 Claims, 4 Drawing Sheets

CROSS-SECTIONAL VIEW TOP VIEW

WAFER-SCALE IMAGE ARCHIVING AND RECEIVING SYSTEM

CROSS-REFERENCE TO RELATED APPLICATIONS

This application claims priority from U.S. Provisional Patent Application Ser. No. 60/884,768, titled PRESERVATION/STORAGE OF DATA AS IMAGES ON SILICON WAFERS USING NANOTECHNOLOGY, filed Jan. 12, 2007, which is hereby incorporated by reference.

FIELD OF THE INVENTION

This invention relates to the long-term storage of images on substrates that can be processed using semiconductor fabrication techniques, and more particularly to the long-term storage of images on silicon wafer substrates. The invention further relates to the high-speed retrieval of images stored on silicon wafer substrates.

BACKGROUND OF THE INVENTION

As unique documents are created and the desire to back-up information is increased the need effectively to archive data increases. On an individual level, information such as letters, property papers, financial documents, photographs and such are preserved for sentimental, personal, and financial reasons. Federal institutions invest time and money to preserving legislative, executive, judicial documents, as well as birth and death records of the citizens. Historical documents are archived to retain the information stored within them as the documents deteriorate with age and become brittle. The archived copies can provide access to the information in the event the original document is lost or destroyed and can further provide multiple copies for access to numerous individual.

Due to the sheer volume of the above described data, paper-based storage is expensive and very cumbersome. Furthermore, paper is susceptible to environmental hazards such as water and fire. Paper documents do not age well with time unless great care is taken to preserve the paper. As a result, alternative storage techniques such as microfilm/microfiche and electronic memory were developed.

In the microfilm technology, images are preserved similar to the black and white photography process. This process utilizes image reduction techniques to reduce the size of images which are later exposed on to photosensitive films. These films are then preserved in a controlled environment for long-term preservation. However, this technology requires special microfilm viewers to view the images. Furthermore, high-quality hard-copy reproduction is expensive and the duplication process is difficult. In addition to these disadvantages, high-speed storage and retrieval are not possible with microfilm technology.

Another form of archiving is electronic storage. Data are stored electronically in the form of digital bits and using integrated circuits on semiconductor memory. Semiconductor memory can be broadly classified as either volatile and non-volatile. Volatile memory requires electrical power to retain information, while non-volatile memory can retain stored information even when not powered. An example of volatile memory is random access memory (RAM) used in most computers. Non-volatile memory includes semiconductor based flash memory, read-only memory (ROM) and most magnetic storage and optical disc storage such as CD ROMs and DVD ROMs. However, even though the semiconductor memory stores the data in a compact area, the data itself is processed and digitized prior to storage. The information must be converted to digital bits, which are represented in various forms depending on the medium of storage. In semiconductor memory, the digital bits are represented by different voltage levels that are stored using integrated circuits and/or capacitors. On CD ROMs the bits are represented as "pits" and "grounds" that reflect a laser in different ways to read the CD ROM. In most semiconductor memory applications the digital bits are encoded prior to storage, and thus require a decoding technique for retrieving the data. This digitalization of data prior to storage can result in quantization losses. Furthermore, semiconductor memory depends very much on the current mainstream technology, thereby forcing the users to upgrade frequently to new types of storage media and media reading devices.

Therefore, a stable long-term image archiving system capable of storing a large number of images in a compact medium is desired.

Further, an archiving medium that is resistant to fire, water and time deterioration is desired.

Yet further, a high-speed storage and retrieval system for rapid access to images is desired.

SUMMARY OF THE INVENTION

The invention comprises, in one form thereof, a system for the long-term storage and high-speed retrieval of images stored on semiconductor substrates. The images are stored by utilizing semiconductor fabrication techniques such that, with magnification, the images are visible to the human eye. Datasets from print, digital or other media are converted to an image. An image organization software program organizes the images and generates a barcode image. The image organization software program further generates metadata associated with each image and stores that metadata both in an electronic database and on the metadata associated with the barcode associated with that particular image. Each barcode is a unique identifier that contains both the metadata and the location information for each specific image on the silicon wafer substrate. The images and barcodes are transferred to specific predetermined locations on the silicon wafer substrate by photolithography tools and nanotechnology fabrication techniques.

The stored images are easily retrieved by use of a first software program. The first software program searches for the user's queries in the electronic database and sends the metadata relating to that particular image to the image reader. The image reader scans the barcode image for the proper barcode. The image reader then transmits the location information from the proper barcode to the system to drive either the optics over the silicon wafer or the wafer itself to the appropriate location relative to the optical system. The desired image is then displayed for the user. Assuming correct wafer is loaded onto the system, once the user submits his request for an image the entire process can be completed in a few milliseconds.

An advantage of the present invention is that large amounts of stored data are compactly stored and can be accessed very rapidly.

A further advantage of the present invention is that the images retain excellent image quality over time.

An even further advantage of the present invention is that the use of silicon wafer substrates makes the images resistant to damage by fire and water.

BRIEF DESCRIPTION OF THE DRAWINGS

The present invention is disclosed with reference to the accompanying drawings, wherein.

Corresponding reference characters indicate corresponding parts throughout the several views. The examples set out herein illustrate several embodiments of the invention but should not be construed as limiting the scope of the invention in any manner.

DETAILED DESCRIPTION

This invention relates to storing data as images on semiconductor substrates, particularly for long-term preservation using imaging and semiconductor fabrication techniques. In this technique, data are stored in such a way that it is visible to the human eye usually with magnification, though it is possible to view large-scale images without magnification. The data from printed documents, digital files, or any other media are converted to images. These images, with the help of photolithography tools and fabrication techniques, are then imprinted and etched on semiconductor substrates, such as silicon wafers. The use of silicon makes the information resistant to both high temperatures up to 400° C. and water exposure ensuring longevity, which is very useful in preserving documents. Since the stored data are not processed or digitized before storing, the data can be stored for long periods without degrading over time. One advantage of this technique is retrieval of the data can be as simple and straightforward as magnifying the image on the semiconductor substrate thereby eliminating the need for a computer or complex reading devices. This feature enables archival of data in a technology free environment. Furthermore, based on the semiconductor fabrication technique used, nano-scale images can be imprinted thereby making it possible to store large quantities of data on each single semiconductor substrate. The nano-scale images have features smaller than 90 nm. Another advantage of the semiconductor fabrication technique is the ability to deposit various layers of metal, polysilicon, and polymers vertically on the silicon substrate. This method of depositing different layers vertically can be used to encrypt the image for security. The encrypted images can then be read using dedicated instruments. Hence the proposed technique is a unique and radically innovative way of storing images on silicon wafers.

Figure 1:
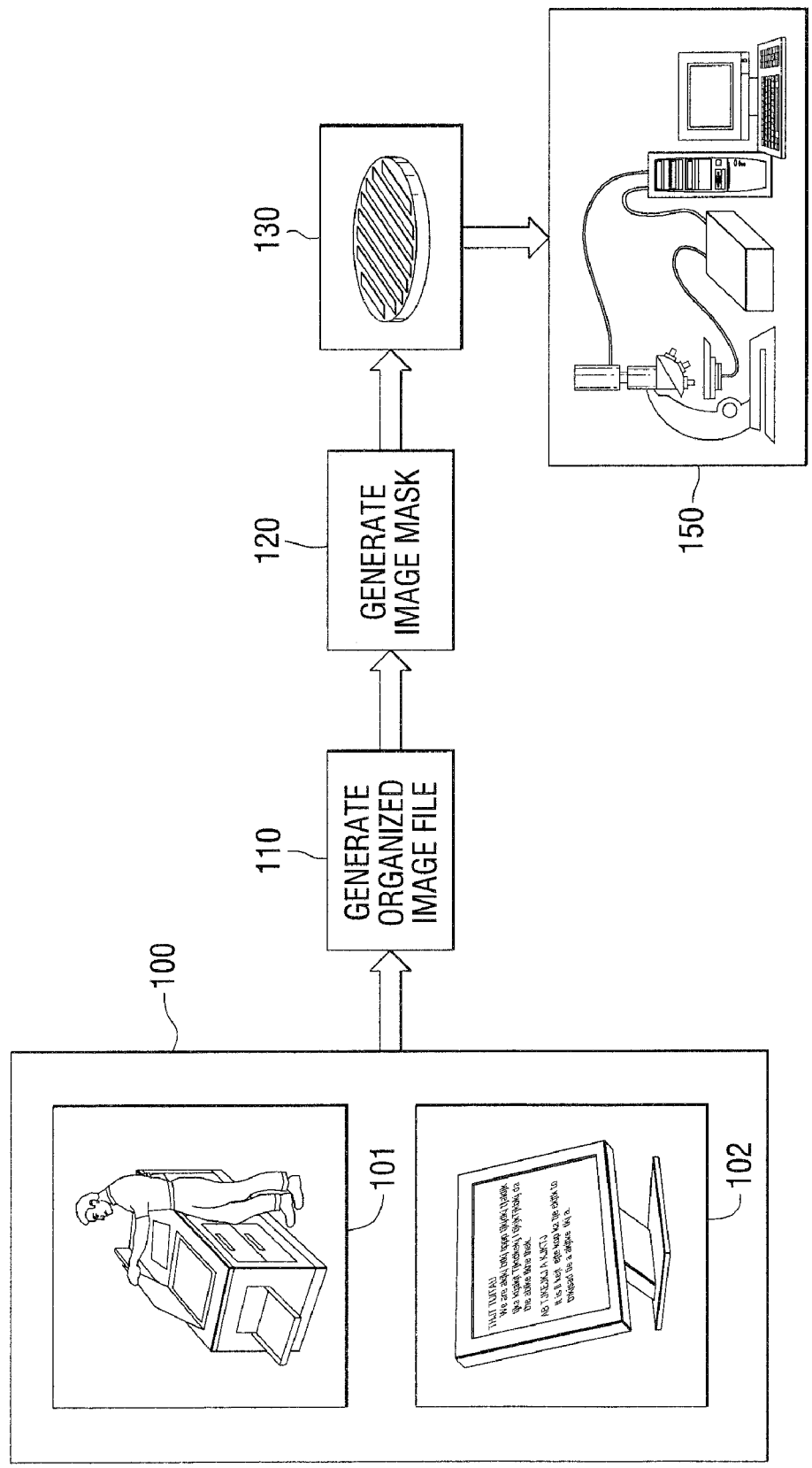
FIG. 1 is a flowchart demonstrating the capture, storage and retrieval of images according to the present invention.

Referring to FIG. 1, there is shown a process flow chart according to one embodiment. During the image collection step 100 image files are generated. The image files can be user generated image files 101, that are transferred directly from a user's computer or storage medium. Alternatively, the image files can be created image files 102. These created image files 102 are generated from viewable sources such as books, manuscripts, maps, photographs, microfiche, microfilm, checks, drawings, maps, photographs or electronic documents. The viewable sources are scanned and converted into an image file. A first software program generates an organized image file 110. The organized image file 110 is a file containing a layout of the image files that are later reproduced on the semiconductor substrate. The images are arranged such that, if possible, all images will fit on a single wafer. Additionally, the first software program generates at least one image contains barcodes. In generating the organized image file 110, the first software program assigns a location to each image file. This location information is encoded into a barcode. A single barcode can contain location information for a plurality of individual images. The first software program further generates metadata for each image. The metadata contains the wafer information for which the image is stored on, the barcode associated with the image, and optionally any details or description of the image.

An image mask 120 is generated from the results of the organized image file 110. The image mask 120 is utilized to fabricate a silicon wafer 130 having the organized image file embedded thereon. The silicon wafer 130 is then packaged in a transparent material s such as Fluroware Model No. H93-60. It is understood that custom packaging and designs can be utilized without departing from the scope of the invention. Once the images are embedded onto the wafer it is possible to have over 6000 images on a single wafer. A wafer reader and the barcode image file used for rapid retrieval of a desired image.

The images retained on the silicon wafer are retrieved by the wafer reader 150. A user requests a particular image from a computer system. The computer system then reads the metadata relating to that image and transmits the appropriate barcode to the wafer reader 150 which scans the barcodes on the wafer for the appropriate barcode. The wafer reader 150 decodes the appropriate barcode containing the location information for the desired image. The location information is transmitted to the drive system which then orients the desired image under the optics for imaging and the image is magnified and transmitted to a display.

In use, the images need to be collected. The document or information is converted to a digital image. For example, the information from print media such as books, manuscripts, microfilms, or microfiche is captured using a high-resolution camera and converted to digital images. Alternatively, an electronic file may be converted to digital images. These images are processed such that they are reduced to the desired size based on the fabrication facility.

Each digital image is scaled to the desired size by associating each pixel to a minimum spot size which is limited by the fabrication process. During the scaling process each digital image is represented by the number of pixels in both the X and Y coordinates as well as the resolution expressed in dots per inch (DPI). For example, in a two micron fabrication facility the minimum spot size is two microns. As a result the smallest character size for a two micron facility is 10 microns. Therefore, an image that consists of 6080×1520 pixels at 300 dpi is converted to 12160×3040 microns.

In the reduction process standard size images are reduced to smaller dimensions. For example, using the 200 nm fabrication technology, character sizes are reduced to 20 microns. Using this technique a standard legal paper (8½ by 11 inches) can be reduced to fit in an area of 2.68 mm². At this resolution, a 6-inch wafer can store about 6590 legal-size pages. In one embodiment an 8" diameter wafer is used. It is understood that other standard wafer sizes such as 4" or 12" diameter, or custom sized wafers can be used. The wafer may be single or dual-sided depending on the storage needs. In addition, new fabrication techniques with smaller feature sizes allow for further increases in storage capacity by further reducing the image size. The reduced images are used to prepare the first level lithography masks.

The obtained digital images are converted to binary files using standard half-toning techniques. These binary files are then converted to MEBES or similar files using the conversion software such as Tiff2MEBES that was developed by Artwork Conversion Software Inc. After selecting a set of MEBES files that shall be placed on a wafer, a job deck program is generated that specifies the location of each MEBES file on the mask. Using the job deck file and the associated MEBES files, a mask shop creates a photomask (typically consists of Cr on soda-lime glass) that is used in the photolithography process to create the final wafer.

In one embodiment the semiconductor substrate is single-side mirror polished 150 mm test-grade silicon wafer that was grown using the CZ method having a thickness of about 650+/−25 micron. In another embodiment the wafer is a duel-sided wafer. There are many known techniques for processing duel-sided wafers. For example, one of the most common techniques is sequential processing. In this process one side of the wafer is processed completely and then the other side is processed.

In one embodiment the wafer contains an RFID tag. The RFID tags are fabricated onto the wafer during the wafer processing steps. Alternately, the RFID tags are attached to the surface of the wafer using standard adhesives. The RFID tags can be off the shelf components or fabricated as part of the wafer. The RFID tags allow for rapid location and identification of a particular wafer.

Referring again to first software program, images are organized for preparing the image mask. Given the size of the documents computed by the input size, resolution and the fabrication facility limitations, and the size of the wafers used in the process, the first software program computes the number of images capable of being placed on the wafer. Using this information the first software program assigns an XY coordinate location relative to the reference point to each MEBES file and any barcode images.

In one embodiment the barcode image is centered on the substrate. It is understood that the barcode image can be positioned in a location other than the center of the substrate. The barcode image may be of the same or different size than the other images on the wafer.

Figure 2:
FIG. 2 is a process flow chart for silicon image preservation according to the present invention.
Figure 2:
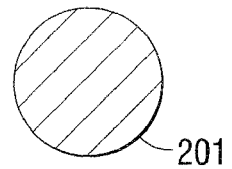
Figure 2:
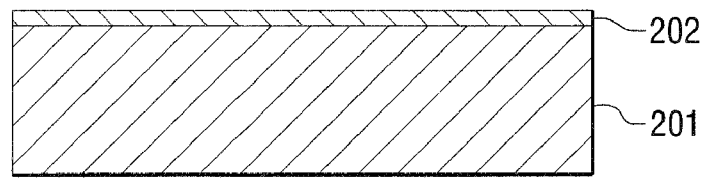
Figure 2:
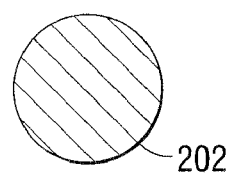
Figure 2:
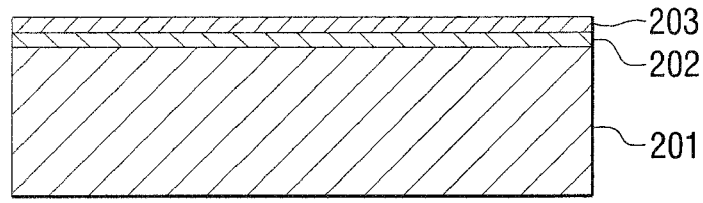
Figure 2:
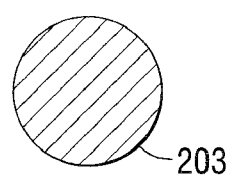
Figure 2:
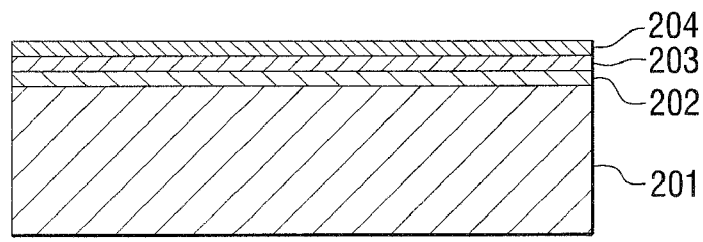
Figure 2:
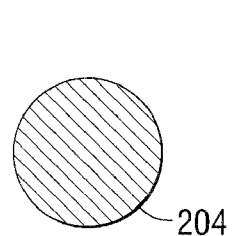
Figure 2:
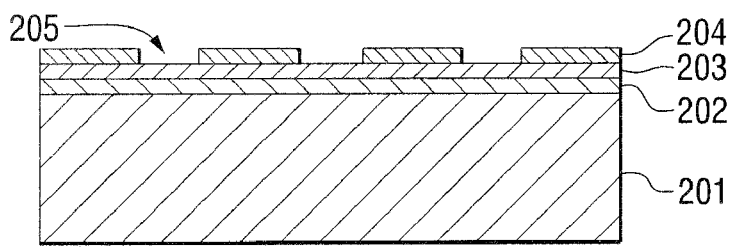
Figure 2:
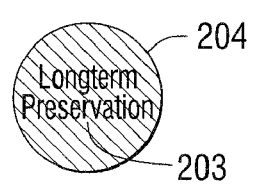
Figure 2:
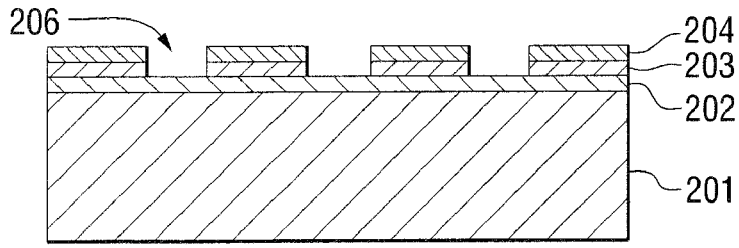
Figure 2:
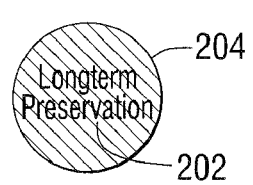
Figure 2:
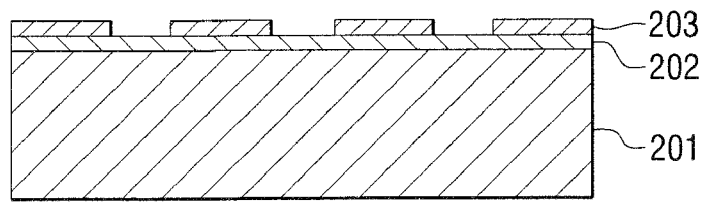
Figure 2:
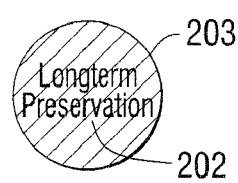

Referring to FIG. 2, there is shown a process flow chart for preserving an image on a semiconductor substrate according to one embodiment. It is understood that any suitable semiconductor substrate processing technique may be used to preserve the image. The process begins with a silicon substrate 201. A silicon dioxide layer 202 is grown or deposited over the silicon substrate 201. In one embodiment the silicon dioxide layer is about 1 µm thick. A metal layer 203 is then deposited over the silicon dioxide layer 202. In one embodiment the metal is aluminum in a 0.4-µm-thick layer. A photoresist layer 204 is deposited over the metal layer 203. Using the mask previously generated, and traditional lithography techniques, portions of the photoresist layer 205 are removed to form an image representative of the organized image file. In one embodiment the photoresist is patterned by using flood exposure techniques. The photo-resist is developed and removed exposing portions of the metal layer. The portions of the metal layer 206 that are exposed are then removed by etching. In one embodiment, an anisotropic wet etch is used. In an alternative embodiment, a dry plasma etch is used. The remaining photoresist removed, leaving the image embedded in the metal layer 203. Additional layers may be deposited over the metal layer to assist in preserving or encrypting the image, such as a passivation layer of $SiO_2$, that is typically about 100 Å, or 10 nm thick.

Figure 3:
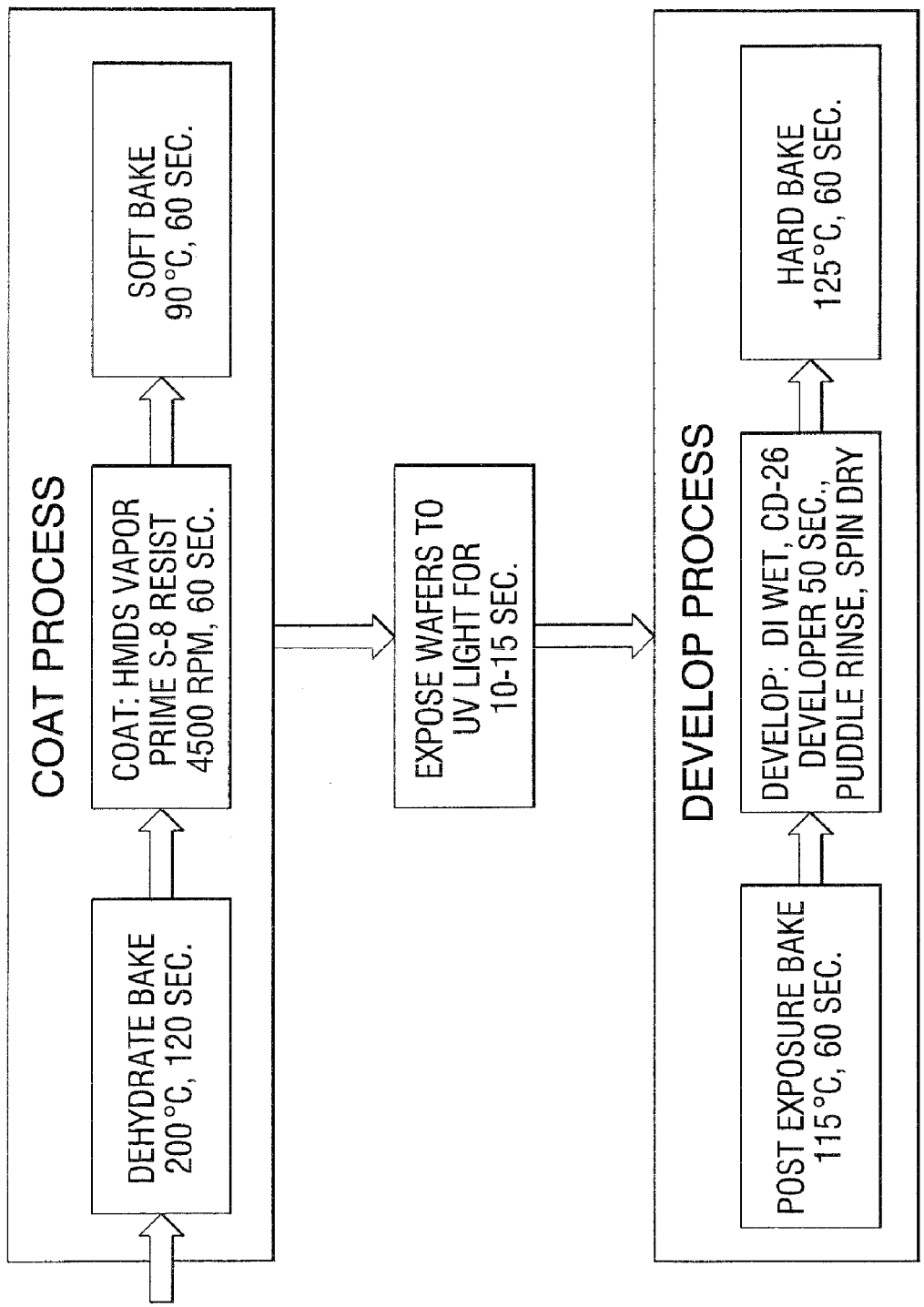
FIG. 3 is a process flow chart illustrating the various steps involved in a lithography process.

Referring to FIG. 3 there is shown a process flow chart illustrating the various steps involved in a lithography process. The wafers are coated with a passivation layer and metal and are patterned using the various fabrication steps. The photolithography process consists of three stages coat, expose and develop. First, the wafers are coated with a positive photoresist (S-8). Second, the photoresist is exposed to UV light with a clear field mask. The clear regions on the mask allow light to pass through thereby dissolving the photoresist at that location, and thereby creating the desired pattern. The pattern on the mask corresponds to the organized image file. Third, the pattern is developed by using a developer such as CD26. After developing the wafers are ready for additional process steps such as an aluminum etch.

In one embodiment grayscale images are generated in the wafer. A white spot represents the reflectivity of aluminum and black spot represents the reflectivity of silicon. Small spot sizes can easily be achieved in nanotechnology. This capability enables the storage of grayscale images, especially graphical information such as pictures, drawings etc., by using half-toning techniques where multiple high resolution dots of aluminum and $SiO_2$ are merged together using standard half-toning techniques to map the original image to the binary image.

In another embodiment color images are generated. The color images are stored using a similar technique as described with the storage of grayscale images. However, instead of only having white and black, four laterally placed images are used to represent cyan, magenta, yellow and black to form a colored image. The combination of light reflection off of each layer generates the colored image.

When using a first level photolithography process there is no need to check for alignment prior to masking. However, the data placed on a mask may include orientation indicators such as a flat edge, standard test structures, or fiducials at predefined reference locations. These test structures are used for alignment checks and image retrieval reference points.

After the images are stored on the wafer the wafer is packaged and stored for archiving. In one embodiment the packaging is clear to allow uninhibited scanning of the images. In an alternative embodiment the packaging only allows the passage of a limited light spectrum.

Figure 4:
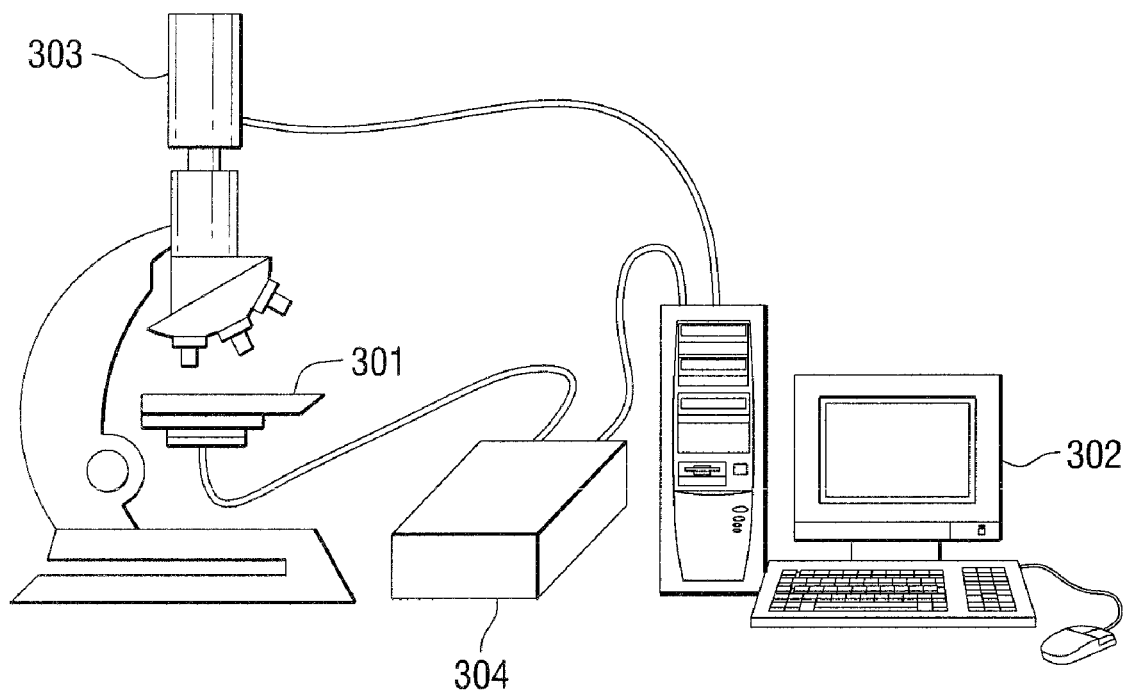
FIG. 4 is a schematic of a silicon-wafer reader according to one embodiment of the present invention.

Referring to FIG. 4, there is shown a wafer-reading device according to one embodiment. To retrieve an image a user enters the image request into the image retrieval system 300. The computer 302 accesses the previously stored metadata and transmits the barcode information for the desired image to the camera 303. The camera scans the barcode image, which is located at a predetermined location on the wafer, and transmits the barcode image to the computer 302. The a software program residing on the computer 302 decodes the barcode. The barcode contains the location information for the image such as the X and Y coordinates on the wafer. The computer 302 transmits the location information to the alignment device 304, and the alignment device 304 positions the silicon wafer such that the camera 303 can scan the desired image. The camera 303 transmits the image file to the computer 302, which then displays the image.

Referring to the barcode image, it is desirable to reduce the size of the barcode image to allow more space for other image files. In one embodiment each barcode contains location information for a plurality of images. The size of the barcode image is about the same size as the other images on the wafer. In an alternative embodiment an image location device, other than a barcode image, such as an image similar to the index page in a book is used. The data from this image is extracted using standard OCR algorithms.

After the barcode image is scanned by the camera the image is transmitted to the computer. A custom software program extracts the individual document barcodes. After determining the proper barcode the custom software program extracts the location information from the barcode and transmits the X and Y coordinates to the alignment device.

For systems containing multiple wafers each wafer is labeled and the proper wafer is loaded onto the wafer reader. In one embodiment RFID tags are used for identifying the wafer. RFID tags are efficient in the retrieval of a wafer in a system containing a large collection of wafers. In one embodiment the wafer reader equipment has the necessary electronics attached to robotic arms. The robotic arms scan the RFID tags for the correct wafer. The robotic arm then removes the correct wafer and positions the wafer on the wafer reading plate. Because the system scans the RFID tags it is not necessary for the wafer to return to its original location. It is understood that any cataloging system can be used to organize the wafers for storage and access.

Wafers typically have a single or double notch that can be used for alignment once placed on the wafer reading plate. Optical indicators at predetermined positions can also be used as alignment marks and reference points.

After a user queries the database that has the metadata and gets a list of possible matches as an output from the system and the proper wafer is placed on the wafer reading plate. The wafer is aligned, the barcode image is scanned and the barcode information is transmitted. The system transmits the X and Y coordinates of the desired image and the spacing between the documents to the alignment device. Using this information the alignment device drives the stage to the desired location. In an alternative embodiment the stage is stationary and the camera is driven to the desired location.

The camera transmits the image to the display. In one embodiment the camera generates a digital image that is obtained by using optics and magnification. In the event the wafer is encrypted the system will be equipped with an encryption reader. The encrypted readers is designed to look for predefined patterns on the wafer. Once the patterns are identified the reader collects the data of the various layers on the wafer and reconstruct the desired output using a custom encryption software program.

In yet another embodiment, the invention contains a semiconductor substrate having a plurality of images and an image location device thereon. At least ten percent of the images are unique and distinct from the other images on the substrate. The image location device represents the location of one or more images on the substrate. For example, the image location device can be an image of barcodes containing the X and Y coordinates for the images on the substrate. Alternatively, the image location device can be an image of spreadsheet containing a reference to each image and the location information for that image.

While the invention has been described with reference to particular embodiments, it will be understood by those skilled in the art that various changes may be made and equivalents may be substituted for elements thereof without departing from the scope of the invention. In addition, many modifications may be made to adapt a particular situation or material to the teachings of the invention without departing from the scope of the invention.

Therefore, it is intended that the invention not be limited to the particular embodiments disclosed as the best mode contemplated for carrying out this invention, but that the invention will include all embodiments falling within the scope and spirit of the appended claims.

The invention claimed is:

1. An image retention device comprising:
   a semiconductor substrate having at least one imaging surface and at least one orientation indicator;
   a plurality of half-toned images embedded on said at least one imaging surface; and
   an image location device located on said semiconductor substrate, wherein the image location device contains location information for said plurality of images located on said at least one imaging surface.

2. The image retention device of claim 1 wherein said image location device is an image embedded on said at least one imaging surface having a plurality of barcodes containing the location information.

3. The image retention device of claim 1 wherein the location information is the X and Y coordinates of the image on the semiconductor substrate.

4. The image retention device of claim 1 wherein the semiconductor substrate comprises two imaging surfaces, one on each surface of the wafer.

5. The image retention device of claim 1 further comprising an RFID tag having a unique indicator capable of identifying the image retention device.

6. The image retention device of claim 1 wherein said plurality of images is at least 100 images.

7. The image retention device of claim 1 wherein said at least one orientation indicator is fiducials on the semiconductor substrate.

8. The image retention device of claim 1 wherein said image location device is an image of about the same size as one of said plurality of images.

9. The image retention device of claim 2 wherein said plurality of barcodes containing the location information for each said plurality of half-toned images embedded on said at least one imaging surface.

10. An image archiving system comprising:
    a silicon wafer having an imaging surface;
    a plurality of half-toned images on said imaging surface;
    a barcode image located on said silicon wafer containing a plurality of barcodes containing the location information for at least one of said plurality of images located on said imaging surface, wherein the barcode image is located in a predetermined location on the imaging surface;
    a barcode reader capable of scanning the barcodes located on the barcode image;
    a microprocessor; and
    an optical reader capable of reading at least one of said plurality of images.

11. The image archiving system of claim 10 further comprising a computer system containing metadata for said plurality of images.

12. The image archiving system of claim 11 wherein said plurality of barcodes further comprises metadata corresponding to the metadata located on the computer system.

13. The image archiving system of claim 10 wherein said silicon wafer has at least one orientation indicator.

14. The image archiving system of claim 13 wherein the optical reader is capable of identifying said orientation indicator and sending orientation instructions to the microprocessor.

15. A method for retaining images on a semiconductor substrate comprising:
scanning a plurality of images;
condensing the plurality of images to a bit-mapped image file, such that the image file organizes the plurality of images to fit on a silicon wafer;
writing the bit-mapped image file onto a silicon wafer substrate as a plurality of half-toned images; and
writing an image location device onto a silicon wafer as a half-toned image, said image location device containing the location information for at least one of said plurality of images located on said silicon wafer.

16. The method of claim 15 wherein said bit-mapped image file is a TIFF image file.

17. The method of claim 16 wherein said image location device is a plurality of barcodes containing metadata.

18. The method of claim 17 further comprising the step of reading said plurality of barcodes to locate the metadata associated with an image request.

19. The method of claim 18 further comprising the step of reading and displaying the image associated with the image request.

* * * * *